United States Patent [19]

Dryden

[11] 3,927,258

[45] Dec. 16, 1975

[54] COMPATIBLE SCANNING SYSTEM

[75] Inventor: Eugene H. Dryden, San Marino, Calif.

[73] Assignee: The United States of America as represented by the Secretary of the Air Force, Washington, D.C.

[22] Filed: Oct. 21, 1974

[21] Appl. No.: 516,840

Related U.S. Application Data

[63] Continuation-in-part of Ser. No. 320,796, Jan. 3, 1973, abandoned.

[52] U.S. Cl. ........................... 178/6.8; 178/DIG. 23
[51] Int. Cl.[2] ............................................ H04N 7/18
[58] Field of Search ............... 178/6.8, 7.1, DIG. 23; 250/213 A

[56] References Cited

UNITED STATES PATENTS 3,614,521 10/1971 Brueschke ............................. 178/6

*Primary Examiner*—Howard W. Britton
*Attorney, Agent, or Firm*—Joseph E. Rusz; Julian L. Siegel

[57] ABSTRACT

A system for connecting a periodic sensing system to a conventional television monitor. A series of sensors are sampled by a multiplexer and fed to a blanking circuit which is triggered by the same clock that triggers the multiplexer. Derived vertical synchronization pulses are counted and fed to a delay circuit that delays a signal from the multiplexer indicating a complete frame, this signal becoming the horizontal synchronization pulses. The video, horizontal synchronization, and vertical synchronization are then fed to combining circuit.

2 Claims, 2 Drawing Figures

COMPATIBLE SCANNING SYSTEM

CROSS REFERENCE TO RELATED APPLICATION

This application is a continuation-in-part of my copending application filed on Jan. 3, 1973 and having Ser. No. 320,796 now abandoned.

BACKGROUND OF THE INVENTON

This invention relates to a compatible scanning system, and more particularly to connecting a multichannel sampling network to conventional television monitor.

The customary technique for displaying a multichannel sensing system on a standard television monitor is to use a scan converter. In the present invention the scan converter is eliminated and the results of the multichannel sensing is directly displayed on the television monitor.

The invention has application not only to imaging electrooptical systems, but also to many other forms of multichannel sensors which can be displayed on a cathode ray tube.

SUMMARY OF THE INVENTION

The present invention is a display system which uses multisensor elements, such as infrared sensors, whose output is applied to a multiplexer so operated by a clock as to follow a frame rate which is equal to a television display line rate. The horizontal synchronization pulse is combined with the vertical synchronization pulse and with the video signal to provide a composite video display which can be recorded either visually or with a video tape recorder.

It is an object of the invention to provide a system for sampling a series of channels and displaying the series on an unmodified standard television monitor.

It is yet another object to provide a multichannel sensor system for directly displaying on a television monitor without the necessity of a scan converter.

It is still another object to provide a multichannel sensing system that is displayed directly on a television monitor and having an increased sensorresolution.

These and other objects, features and advantages of the invention will become more apparent from the following description taken in connection with the illustrative embodiment in the accompanying drawings.

DETAILED DESCRIPTION OF THE PREFERRED EMBODIMENT

The invention is a system for displaying the outputs of multichannel sensors on an unmodified standard television display. The sensor may be of any type, such as an infrared sensor employing multiple detectors. Also, a 525 line, 2:1 interlace 30 frame per second display is used for purposes of illustration, although any other display configuration may be applied with suitable parameter changes.

Figure 1:
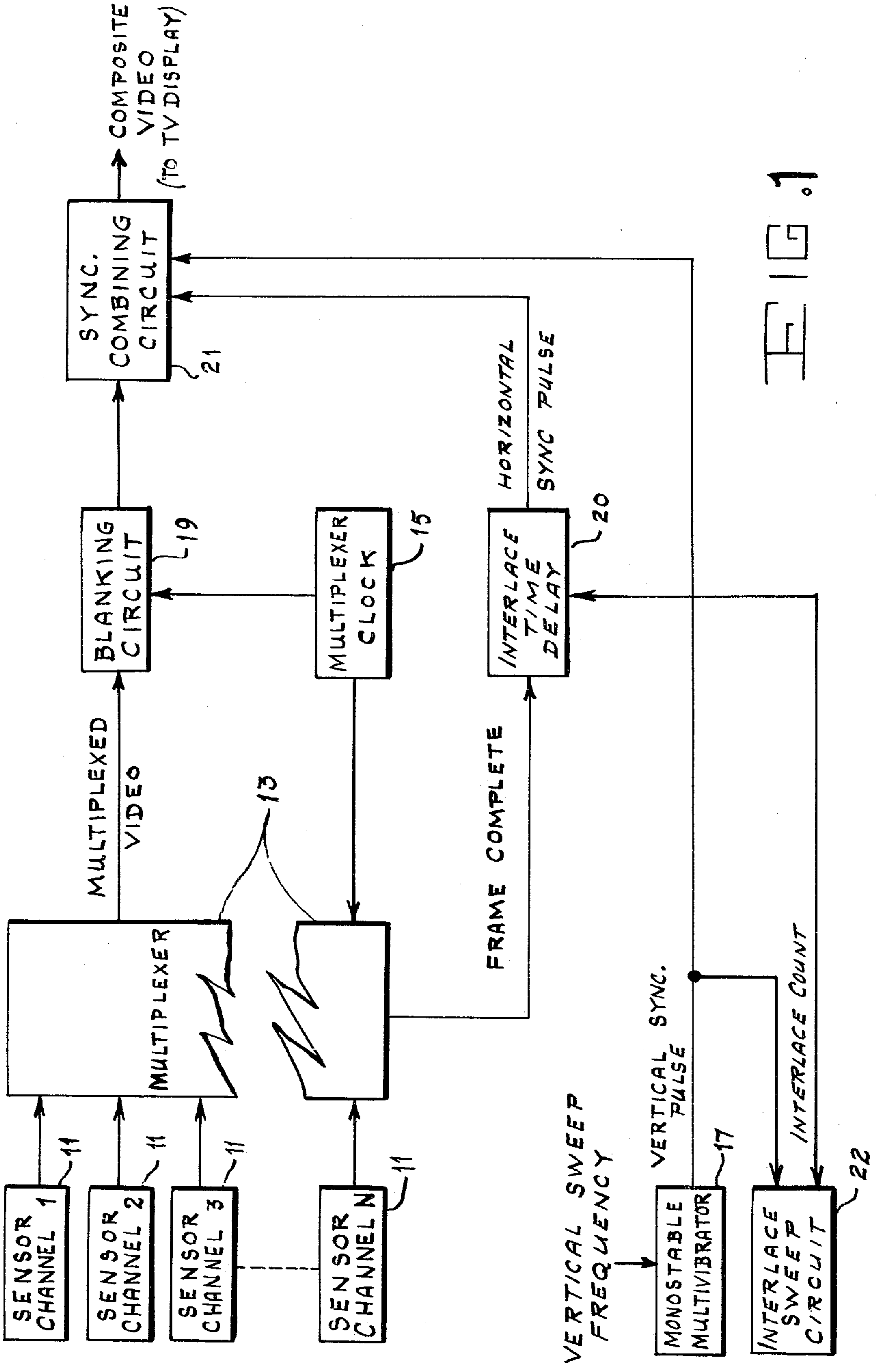
FIG. 1 is a schematic block diagram showing an embodiment of the invention.

As shown in FIG. 1, each of the sensor channels is in turn sampled by multiplexer 13 or a commutator of appropriate design. Multiplexer clock 15 provides timing for multiplexer 13 with one output and controls blanking circuit 19 with a second output as indicated by separate arrows. Clock 15 is so designed as to operate multiplexer 13 at a frame rate which is equal to the television display line rate, which in this example is 15,750 Hz. Such a clock can be any of the well-known systems for providing uniform timing pulses such as an astable multivibrator or, for the present case, a pair of multivibrators to provide separate frequencies. Channels 11 are scanned in the direction perpendicular to the display line scan typically perpendicular to the horizontal scan in a sawtooth manner as controlled by monostable multivibrator 17 at a field rate equal to the field rate of a standard television display, in this case, 60 Hz. This frequency is the vertical sweep frequency and circuit 17 produces the vertical synchronization of pulses. Circuit 17 could be any conventional means of deriving pulses from a given input frequency such as a monostable multivibrator as is shown.

Blanking circuit 19 causes the output of multiplexer 13 to be sampled for a fraction of the dwell time determined by the sensor interlace ratio, 25 percent of dwell time for a 4:1 interlace. Blanking circuit 19 can consist of a field effect transistor whose gate is driven by blanking signals derived from multiplexer clock 15 which causes blanking of the video signal between sensor channels during retrace.

Figure 2:
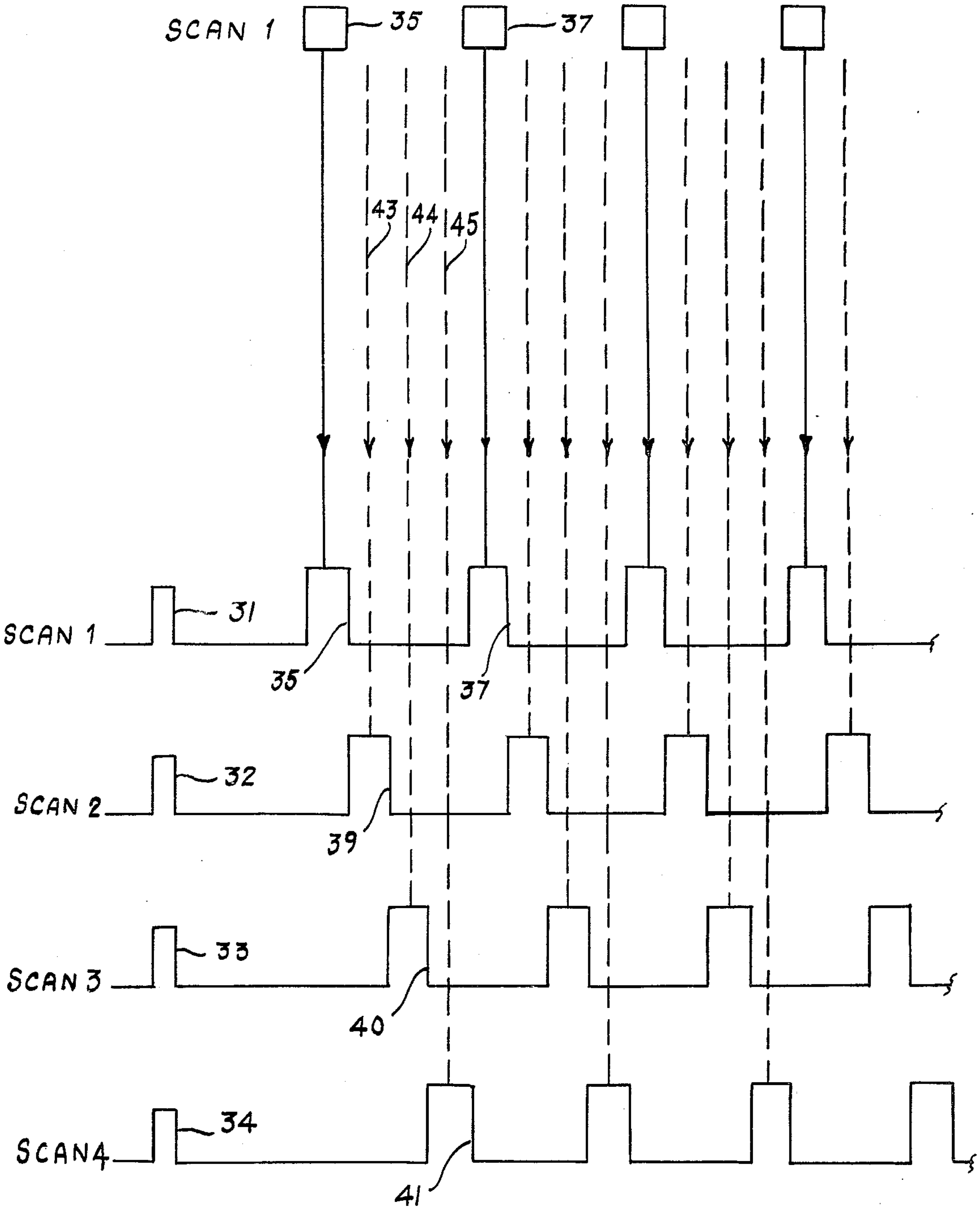
FIG. 2 is a waveform and timing diagram useful in the explanation of FIG. 1.

To provide for proper display registration, a pulse derived from the end of the frame of multiplexer 13 is displayed by an amount dependent upon the interlace counts as shown in the waveform of FIG. 2. This figure appears to show a result of a series of diagonal lines. However, this is also true of the normal television systems as the horizontal scans are actually diagonal lines but only very slightly so and not readily apparent. FIG. 2 is presented in exaggerated form for greater clarity. The delayed frame impulse, which is triggered by multiplexer 13 on the last channel, provides the display horizontal synchronization pulse. This delay is produced by interlace time delay circuit 20, which can be any conventional delay such as a delay multivibrator or can consist of four monostable multivibrators which provide an appropriate delay between the multiplexer sampling pulses to the horizontal sync pulses as shown in FIG. 2. The specific time delay for each monostable multivibrator being used is determined by the specific interlace scan being performed as determined by the interlace count, which is the second input to the interlace time delay 20. The delay is determined by the interlace count which is derived from interlace sweep circuit 22, which is merely a counter circuit that counts the number of vertical synchronizing pulses and results in an interlace count of 1, 2, 3, or 4, that determined the magnitude of the interlace time delay.

The components are largely composed of readily available circuit "flatpacks." The multiplexer is merely a composite of a number of commercially available integrated circuit units, as is the multiplexer clock, the interlace time delay, interlace sweep circuit, etc. The sync combining circuit typically is comprised of a simple integrated circuit operational amplifier and appropriate resistors and capacitors as are well known in the art.

In an illustration, the sensor used is an infrared sensor, having a large number of detector channels. Let it be assumed that there are 50 detector channels in the sensor. As FIG. 2 shows, each of these detectors is a square element, and is separated by three detector widths from its neighbor. The detector array is oriented with its longitudinal axis in the horizontal direction, and the entire array is caused to scan in the vertical direction, such as by the well known means of electro optical scanning using a system of mirrors. This electro optical scanning system can be so designed to scan the array of detectors in exact synchronism with the vertical scanning motion of the electron beam in a TV type cathode ray tube display. Thus, the array scans in a vertical sawtooth waveform, at a rate of 60 scans per second. Vertical synchronizing pulses derived from the electronic circuitry of the compatible scanning system would synchronize the sensor array's scanning motion with the vertical scanning motion of the display.

As in FIG. 1, the outputs of each of the detector channels are, in turn, sampled by an electronic commutator (or multiplexer). Multiplexer 13 samples all of the detector channels in the array within the length of time required for the electronic beam in the TV display to traverse one horizontal line. That is, multiplexer 13 samples at a frame rate of 15,750 frames per second, each frame including one sample of each detector channel. As in the case of the vertical scanning motion, multiplexer 13 moves synchronously with the scanning motion of the electron beam on the display, and is synchronized with it by means of horizontal synchronizing pulses generated within the multiplexer.

To obtain a faithful reproduction of the sensor outputs, it is necessary that the multiplexer video output be connected to the video input of the TV display only during periods which precisely correspond to spatial coincidence between each sensor and the electron beam on the display. For example, the video signal must be blanked during the retrace time of the electron beam in both the horizontal and vertical directions of scan.

The horizontal synchronization pulse is combined with the vertical synchronization pulse derived from vertical sweep circuit 17 and with the video signal in a synchronization combining circuit 21 to provide a composite video signal which is compatible with a television display or video tape recorder.

FIG. 2 shows an example of four successive scans with the necessary 4:1 interlace. Horizontal synchronization pulses 34 are aligned which signify the beginning of each scan. The channel multiplexer samples follow horizontal synchronization pulses 34. It can be seen that on scan 1, pules 35 and 37 appear in sequence with an appropriate spacing therebetween which is controlled by blanking circuit 19. In scans 2–4, pulses 39 to 41 appear in the horizontal position in alignment with the blanking of scan 1, which is the area between pulses 35 and 37. Above the horizontal scan lines there is shown in 4:1 blanking for scan 1. Pulses 35 and 37 of scan 1 also appear above the horizontal scan to show the relationship to the blanking which is denoted by dotted lines 43–45. The same reasoning applies for the other scans.

The sensor illustration shown in FIG. 2 is known as a 4:1 interlace sensor system (although other interlace ratios may be used). That is, the sensor array only consists of one-one-fourth the number of sensor channels actually required to cover the full width of the field. As a result of this design, it is necessary that the detector array scan the field 4 times to make up a full picture. As FIG. 2 indicates, the first field scan results in a series of vertical lines (50 in the illustration) produced by the sampling action of the multiplexer and the action of the blanking circuit. Prior to initiation of scan 2, the detector array is displaced one detector width to the right, and the time delay between the horizontal synchronizing pulse 32, and the multiplexer sampling pulses is increased a commensurate amount as shown. The same process is repeated for scans 3 and 4. At the end of scan 4, a total period of one-fifteenth second after initiation of scan 1, a total of 200 adjacent vertical lines has been written, each bearing individual sensor output information. Hence it can be seen that the horizontal synchronization pulses are delayed for predetermined time periods on successive scans. This in effect delays the display of the samples acquired by the multiplexer for the same predetermined time period which would prevent the pulses from being aligned with other pulses and allows them to be aligned only with the blanking period between other pulses.

What is claimed is:

1. A system for displaying a plurality of sensors on a television monitor comprising:

a. a plurality of sensor channels;

b. a clock;

c. a multiplexer fed by the plurality of sensors and the clock;

d. a blanking circuit fed by the multiplexing clock and the multiplexer;

e. means for generating vertical synchronization pulses;

f. means for generating an interlace count fed by the vertical synchronization pulse generating means;

g. means for counting the vertical synchronization pulses;

h. a time delay circuit fed by the multiplexer upon completion of the final channel and by the counting means, the output of the time delay circuit representing horizontal synchronization pulses; and i. a combining circuit fed by the blanking circuit, the time delay circuit, and the counting circuit.

2. A system for displaying a plurality of sensors on a television monitor according to claim 1 wherein the vertical synchronization pulse generator means is a monostable multivibrator.

* * * * *